United States Patent

Tomic et al.

[11] Patent Number: 5,709,915
[45] Date of Patent: Jan. 20, 1998

[54] ADHESIVE STRUCTURE FOR HEAT SEALING

[75] Inventors: Mladomir Tomic, Appleton; Gregory L. Petkovsek, Menasha, both of Wis.

[73] Assignee: Reynolds Consumer Products, Inc., Appleton, Wis.

[21] Appl. No.: 511,214

[22] Filed: Aug. 4, 1995

[51] Int. Cl.⁶ .............. B29C 47/06; B32B 3/10; B32B 27/32; B32B 27/36
[52] U.S. Cl. .......... 428/35.2; 428/35.3; 428/35.4; 428/131; 428/133; 428/461; 428/463; 428/458; 428/480; 428/483; 428/516; 428/518; 428/520; 383/61; 383/63; 156/244.11; 156/244.17; 156/272.2
[58] Field of Search .................. 428/35.2, 35.3, 428/35.4, 131, 133, 516, 518, 520, 480, 483, 458, 461, 463; 156/272.2, 244.11, 244.17; 383/61, 63

[56] References Cited

U.S. PATENT DOCUMENTS

| | | | |
|---|---|---|---|
| 4,424,256 | 1/1984 | Christeusen et al. | 428/35.3 |
| 4,561,108 | 12/1985 | Kamp | 383/63 |
| 4,691,373 | 9/1987 | Ausnit | 383/63 |
| 4,716,061 | 12/1987 | Winter | 428/35.3 |
| 4,756,629 | 7/1988 | Tilman et al. | 383/63 |
| 4,756,917 | 7/1988 | Kamada et al. | 428/35.3 |
| 4,835,835 | 6/1989 | Gould | 29/572.7 |
| 4,848,928 | 7/1989 | Ausnit | 383/63 |
| 4,906,494 | 3/1990 | Babinec et al. | 383/63 |
| 4,925,318 | 5/1990 | Sorensen | 383/63 |
| 5,004,368 | 4/1991 | Matsui | 383/63 |
| 5,017,021 | 5/1991 | Simonsen et al. | 383/63 |
| 5,067,822 | 11/1991 | Wirth et al. | 383/61 |
| 5,110,639 | 5/1992 | Akao | 428/35.2 |
| 5,185,909 | 2/1993 | Inagaki | 383/63 |
| 5,198,055 | 3/1993 | Wirth et al. | 156/66 |
| 5,216,787 | 6/1993 | Custer et al. | 24/587 |
| 5,462,360 | 10/1995 | Tilman et al. | 383/63 |
| 5,492,411 | 2/1996 | May | 383/63 |

*Primary Examiner*—Rena Dye
*Attorney, Agent, or Firm*—Alan T. McDonald

[57] ABSTRACT

The present invention addresses the need to effectively heat seal various polymeric materials to each other. The invention is particularly useful in solving the problems associated with sealing dissimilar materials together. A bonded polymer structure and method for preparing the structure are provided. The bonded polymer structure comprises a first polymeric panel, a second polymeric panel, and a one layer adhesive or two layer adhesive structure which binds them together. The two layer adhesive structure comprises a tie layer and a sealant layer disposed between the first polymeric panel and the second polymeric panel, the tie layer contacting the first polymeric panel and the sealant layer, and the sealant layer contacting the layer and the inner side of the second polymeric panel. A closure arrangement may be integrally formed with the first polymeric panel.

The first polymeric panel may consist of such compounds as polyethylene, polypropylene, copolymers of polyethylene and polypropylene, and physical mixtures thereof. The second polymeric panel may consist of such compounds as polyethylene, polypropylene and mixtures thereof, polyester, and polystyrene. An appropriate adhesive is utilized to seal the two panels depending on the composition of the second panel.

31 Claims, 2 Drawing Sheets

ADHESIVE STRUCTURE FOR HEAT SEALING

FIELD OF THE INVENTION

The present invention relates to a bonded polymer structure which comprises an improved adhesive. It also relates to an improved method for bonding polymeric panels. In a preferred embodiment, the invention relates to a structure and method for bonding a closure arrangement (zipper) made of polyethylene and/or polypropylene to packaging materials such as polyethylene, polypropylene, polyester, polystyrene, acrylic, polyvinylidene chloride (PVDC), or polyvinyl chloride (PVC).

BACKGROUND OF THE INVENTION

In many commercial applications it is desirable to bond polymeric materials together. For instance, applications in the food packaging industry not only involve bonding such materials as polyethylene and polypropylene to chemically similar or identical materials but also to dissimilar materials such as polystyrene and polyester.

In food packaging, it is important to prevent air and water from passing out of or into a package containing certain products. This is particularly true with respect to packages which contain items such as meat and cheese, for which the contained foodstuffs must be kept in a constant environment to prevent spoilage. Many polymeric materials such as low density polyethylene and polypropylene mixtures will prevent such food spoilage.

In addition, it is desirable to store items in a package which may be repeatedly opened and closed. For example, when dealing with packaged foods such as sliced luncheon meats, the consumer may initially use only a portion of the meats contained in a package. By providing a package which may be reclosed, the consumer avoids having to locate a storage container for the unused portion of the food in the package. It will be appreciated that reclosable packaging appreciably enhances the marketability of such products.

A typical reclosable package is hermetically sealed by any suitable means, e.g., by a peel seal, a cut-off top, or a combination of a peel seal and a perforation top, which protects the integrity of the package until the consumer initially opens the package. By hermetically sealing a reclosable zipper to the package opening, the consumer may manually reseal the package after its use.

The reclosable means may include a pressure fastenable seal in the form of a rib or male member located on one package wall and a mating groove or female member located on an opposing package wall. This reclosable means is oftentimes referred to as a zipper.

In order to function as a reclosable zipper, the interlocking members of the closure arrangement must be made of a flexible polymeric material such as a mixture of low density polyethylene and polypropylene, the same type of material used to make many packaging materials such as sandwich bags.

Indeed, sealing a reclosable zipper to the packaging material when both the zipper and the packaging material are made of compatible materials is usually accomplished by simply heat-sealing the zipper and packaging material together. A good example of this concept is a reclosable polyethylene sandwich bag. Alternatively, polyethylene closure arrangement panels can be sealed to polyethylene-type materials utilizing an adhesive sealant such as a polyethylene and ethylene vinyl acetate mixture. However, it is always desirable to discover and develop alternative adhesives that work especially effectively for a given combination of similar or identical materials to be sealed to each other.

While polyethylene packaging materials having a reclosable zipper are well known in the art, the use of a reclosable zipper with packaging materials other than those made primarily out of polyethylene would also be desirable in many situations.

For instance, in addition to protecting food from minor air and water losses, it is desirable to use packaging material which minimizes so-called flavor scalping from food. It has been found that polyester packaging materials serve this purpose especially well.

Unfortunately, polyester packaging material is not compatible with, and thus does not adequately heat seal to, items made of polyethylene or polypropylene or mixtures thereof, materials optimal for zipper closure arrangements. Furthermore, it is difficult to seal the materials optimal for zipper closure arrangements to polyester utilizing known one-layer adhesive compositions such as polyethylene-ethylene vinyl acetate mixtures.

Thus, it is desirable in the packaging industry as well as in other industries to develop a sealant material and method of using the same to effectively heat seal such polymeric compounds as polyethylene or polypropylene to various chemically similar compounds or to dissimilar compounds such as polyester or polystyrene whether or not the polyethylene or polypropylene contains a closure arrangement.

SUMMARY OF THE INVENTION

The present invention addresses the need to effectively seal compounds such as polypropylene and polyethylene to each other with an adhesive as well as to better seal such compounds to materials such as polystyrene and polyester to each other using an adhesive. In some cases, a two-layer adhesive structure made up of a tie layer and a sealant layer is most effective for sealing and in other cases, a one-layer adhesive suffices.

Specifically, one embodiment of the present invention provides a bonded polymer structure which comprises a first polymeric panel consisting essentially of polyethylene, polypropylene, copolymers or terpolymers of polyethylene and polypropylene, and physical mixtures thereof, a second polymeric panel consisting of polyester or copolyester, and an adhesive structure which binds them together. The adhesive structure comprises a tie layer and a sealant layer. The tie layer is selected from the group consisting of ethylene vinyl acetate (EVA), anhydride-modified polyolefin-based polymers, blends of EVA and anhydride-modified polyolefin-based polymers, anhydride-modified EVA-based polymers, acid-modified EVA-based polymers, acid-modified polyolefin-based polymers, amorphus polyolefin-modified EVA-based polymers, blends of any of the above materials with polyester or copolyester, and blends of polyolefins with polyester or copolyester. Preferably, in any of the blends the amount of polyester/copolyester should not exceed about 20% by weight. The sealant layer is selected from the group consisting of polyester, copolyester, a polyester-based blend, and a copolyester-based blend.

The tie layer and the sealant layer are disposed between the first polymeric panel and the second polymeric panel, the tie layer contacting the first polymeric panel and the sealant layer, and the sealant layer contacting the tie layer and the inner side of the second polymeric panel.

Another embodiment of the present invention provides a bonded polymer structure which comprises a first polymeric panel consisting of polyethylene, polypropylene, copolymers or terpolymers of polyethylene or polyproplyene, or mixtures of those compounds, a second polymeric panel consisting of one of those same compounds and an adhesive located between the panels which binds them together. The adhesive is selected from the group consisting of anhydride modified polyolefins, metallocene catalyzed linear low density polyethylene, maleic anhydride, anhydride modified ethylene vinyl acetate, polypropylene copolymers, polypropylene copolymers blended with ethylene vinyl acetate, polypropylene copolymers and polyolefin blends, polypropylene terpolymers, polypropylene terpolymers and polyolefin blends, polypropylene terpolymers and ethylene vinyl acetate blends, polypropylene-based thermoplastic polyolefins, butene polypropylene copolymers, polypropylene-based flexible polyolefins, octene-linear low density polyethylene, amorphous polyolefin-modified EVA-based polymers, acid-modified polyolefin-based polymers, and acid-modified EVA-based polymers, along with any blends of these materials with polypropylene copolymers or terpolymers.

Blended adhesives contain an effective amount of each component, preferably at least about 15% by weight of the more polar material and no more than about 85% by weight of the less polar material.

In yet a third embodiment, the present invention provides a bonded polymer structure which comprises a first polymeric panel consisting of polyethylene, polypropylene, copolymers or terpolymers of polyethylene or polypropylene, or mixtures of those compounds, a second polymeric panel consisting of polyester and an adhesive located between the panels which binds them together. The adhesive is selected from the group consisting of blends of polyolefins and polyester, blends of polyolefins and copolyester, blends of ethylene vinyl acetate and polyester, blends of ethylene vinyl acetate and copolyester, acrylic, anhydride-modified polyolefin-based polymers, blends of EVA and anhydride-modified polyolefin-based polymers, anhydride-modified EVA-based polymers, acid-modified EVA-based polymers, acid-modified polyolefin-based polymers, amorphus polyolefin-modified EVA-based polymers, blends of any of the above materials with polyester or copolyester, and blends of polyolefins with polyester or copolyester coated on both the first and second polymeric panels.

Blended adhesives contain an effective amount of each component, preferably at least about 80% by weight of the polyester/copolyester component, with the remainer being of the other component.

In still another embodiment, the present invention provides a bonded polymer structure which comprises a first polymeric panel consisting of polyethylene, polypropylene, copolymers or terpolymers of polyethylene or polypropylene, or mixtures of those compounds, a second polymeric panel consisting of polystyrene, acrylic, PVDC, or PVC and an adhesive located bet-ween the panels which binds them together. The adhesive is made of anhydride-modified polyolefin-based polymers, blends of EVA and anhydride-modified polyolefin-based polymers, anhydride-modified EVA-based polymers, acid-modified EVA-based polymers, acid-modified polyolefin-based polymers, amorphus polyolefin-modified EVA-based polymers.

In a final embodiment, the present invention provides a bonded polymer structure which comprises a first polymeric panel consisting of polyethylene, polypropylene, copolymers or terpolymers of polyethylene or polypropylene, or mixtures of those compounds, a second panel consisting of these same materials, polyester, copolyester, polystyrene, acrylic, PVDC, or PVC, and a hot melt adhesive located between which binds them together. The adhesive is made of polyester-based or polyether-based polyurethane elastomer hot melts, EVA-based hot melts, rubber (styrene)-based hot melts, styrene-butadiene-styrene (SBS)-based hot melts, styrene-isoprene-styrene-based hot melts, styrene-ethylene-butylene-styrene (SEBS)-based hot melts, and styrene-ethylene-propylene (SEP) block copolymer hot melts.

In especially preferred embodiments of each of above described embodiments of the invention, a closure arrangement is integrally formed with the first polymeric panel. The closure arrangement may be reclosable. The closure arrangement may be free of the adhesive structure.

The outer side of the second polymeric panel, the side not bound to the adhesive, may further contain a metallic layer. For instance, in the case where the second polymeric material is packaging material such as a bag, internal or outer surfaces of the bag (not in contact with the adhesive) may be coated with or composed of metal.

The present invention also provides a method of preparing each embodiment of the bonded polymeric structures comprising bonding a first polymeric panel to a second polymeric panel by (a) applying an adhesive or adhesive structure to the first polymeric panel, and (b) heat sealing the first polymeric panel and adhesive or adhesive structure to the second polymeric panel. The adhesive or adhesive structure may be applied to the first polymeric panel by methods which include coextrusion and coating.

BRIEF DESCRIPTION OF THE DRAWINGS

Other objects and advantages of the invention will become apparent upon reading the following detailed description and upon reference to the drawings in which.

Figure 1:
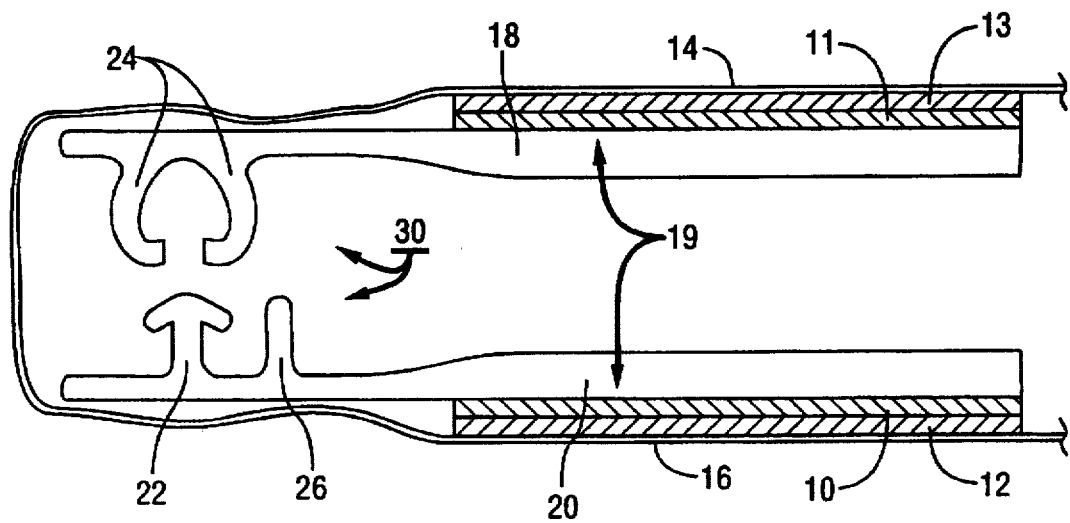
FIG. 1 is a sectional view of a bonded polymer structure wherein a two-layer adhesive structure is used to bind the polymeric panels and having a closure arrangement wherein the closure arrangement is free of the adhesive structure, and the two-layer adhesive is applied to only one of the closure flanges.

While the invention is susceptible to various modifications and alternative forms, a specific embodiment thereof has been shown by way of example in the drawings and will herein be described in detail. It should be understood, however, that it is not intended to limit the invention to the particular forms disclosed, e.g., to a bonded polymer structure which contains a closure arrangement, but on the contrary, the intention is to cover all modifications, equivalents, and alternatives falling within the spirit and scope of the invention as defined by the appended claims.

DESCRIPTION OF THE PREFERRED EMBODIMENTS

The bonded polymer structure of the present invention comprises a first polymeric panel, a second polymeric panel, and an adhesive which binds the two panels together. The adhesive may be a single adhesive layer or a double layered adhesive structure. In the case of a double layered adhesive, the adhesive structure comprises a tie layer and a sealant layer.

The primary characteristics of the first and second polymeric panels are that they bond readily to the adhesive and provide a modicum of thermal resistance so that they do not melt while bonding other materials thereto.

Bonding a First Panel Made of Polyethylene and/or Polypropylene to a Second Panel Made of Polyester In the case where it is desirable to bond a panel made of polyethylene, polypropylene or heat resistant mixtures thereof to a panel made of polyester, such as in the case of a reclosable sandwich bag, a two layer adhesive structure comprising a tie layer and a sealant layer bonds the panels together particularly effectively. In a prototypical reclosable sandwich bag, the first polymeric panel making up the reclosable zipper consists essentially of a heat resistant mixture of polyethylene, polypropylene, copolymers or terpolymers of polyethylene and polypropylene, or physical mixtures thereof. Especially preferred components are low density polyethylene and polypropylene with the preferred weight percentages being 90% polyethylene and 10% polypropylene. Examples are low density polyethylene having a density in the range of about 0.920 to 0.927, such as those manufactured by Westlake Polymers Corporation of Lake Charles, La. or by Rexene Corporation of Odessa, Tex., and polypropylene, ESCORENE® manufactured by Exxon Chemical Company of Baytown, Tex. Alternatively, the first polymeric panel may be composed of low density polyethylene having a density in the range of about 0.920 to 0.927, such as those manufactured by Westlake Polymers Corporation of Lake Charles, La. or by Rexene Corporation of Odessa, Tex. The second polymeric panel making up the bag consists of polyester or copolyester.

The tie layer is composed of a material which bonds well to both the first polymeric panel and to the sealant layer. Optimal compositions for the tie layer include ethylene vinyl acetate (EVA), anhydride-modified polyolefin-based polymers, blends of EVA and anhydride-modified polyolefin-based polymers, anhydride-modified EVA-based polymers, acid-modified EVA-based polymers, acid-modified polyolefin-based polymers, amorphus polyolefin-modified EVA-based polymers, blends of any of the above materials with polyester or copolyester, and blends of polyolefins with polyester or copolyester (e.g., use appropriate grades of DuPont's BYNEL® and APPEEL®, Mitsui's ADMER®, and Quantum's PLEXAR®). Preferably, in any of the blends the amount of polyester/copolyester should not exceed about 20% by weight. Optimal tie layer materials are polar so that they will bind well to the sealant layer as well as to the first polymeric panel.

The sealant layer is composed of polyester, copolyester, a polyester-based blend, or a copolyester-based blend. Blended adhesives contain an effective amount of each component, preferably at least about 85% by weight of the polyester/copolyester, with the remainder being of the other component.

The tie layer and the sealant layer are disposed between the first polymeric panel and the second polymeric panel, the tie layer contacting the first polymeric panel and the sealant layer, and the sealant layer contacting the tie layer and the inner side of the second polymeric panel.

Alternatively, a one layer adhesive made primarily of selected blends of polyolefins and polyester, polyolefins and copolyester, ethylene vinyl acetate and polyester, ethylene vinyl acetate and copolyester, acrylic, anhydride-modified polyolefin-based polymers, blends of EVA and anhydride-modified polyolefin-based polymers, anhydride-modified EVA-based polymers, acid-modified EVA-based polymers, acid-modified polyolefin-based polymers, amorphus polyolefin-modified EVA-based polymers, blends of any of the above materials with polyester or copolyester, and blends of polyolefins with polyester or copolyester will adequately bind first and second polymeric panels made of the compositions described directly above.

Bonding a First Panel Made of Polyethylene and/or Polypropylene to a Second Panel Made of Polyethylene and/or Polypropylene Where it is desired to bond a panel made of polyethylene, polypropylene, copolymers of polyethylene or polypropylene, or mixtures thereof to a panel of similar makeup, a single layer adhesive made of compounds such as anhydride modified polyolefins, metallocene catalyzed linear low density polyethylene, maleic anhydride, anhydride modified ethylene vinyl acetate, polypropylene copolymers, polypropylene copolymers blended with ethylene vinyl acetate, polypropylene copolymers and polyolefin blends, polypropylene terpolymers, polypropylene terpolymers and polyolefin blends, polypropylene terpolymers and EVA blends, polypropylene-based polyolefins, butene polypropylene copolymers, polypropylene-based flexible polyolefins, octene-linear low density polyethylene, amorphous polyolefin-modified EVA-based polymers, acid-modified polyolefin-based polymers, and acid-modified EVA-based polymers, along with any blends of these materials with polypropylene copolymers or terpolymers will bind most effectively (e.g., use appropriate grades of Dupont's BYNEL CXA® or APPEEL®; Exxon's EXACT®; Aristech's UNITE®; Quantum's PLEXAR®or thermoplastic polyolefin, TPO®; Mitsui's ADMER®; Shell's CEFOR®; Rexene's FPO®; Dow's INSITE®).

Bonding a First Panel Made of Polyethylene and/or Polypropylene to a Second Panel Made of Polystyrene, Acrylic, PVDC, or PVC Where it is desirable to bond a panel made of polyethylene, polypropylene, copolymers or terpolymers of polyethylene or polypropylene, or mixtures thereof to a panel made of polystyrene, a single layer adhesive structure made of anhydride-modified polyolefin-based polymers, blends of EVA and anhydride-modified polyolefin-based polymers, anhydride-modified EVA-based polymers, acid-modified EVA-based polymers, acid-modified polyolefin-based polymers, amorphus polyolefin-modified EVA-based polymers will bind most effectively.

Bonding a First Panel Made of Polyethylene and/or Polypropylene to a Second Panel Made of Polyethylene, Polypropylene, Polyester, Polystyrene, Acrylic, PVDC, or PVC using Hot Melts Panels made of polyethylene, polypropylene, or mixtures thereof can be effectively sealed to panels made of those same compounds, polyester and polystyrene, acrylic, PVDC, and PVC utilizing a hot melt compositions. Morton makes polyester-based and polyether-based polyurethane elastomer hot melts, National Starch makes some EVA-based and rubber (styrene) -based hot melts, H.B. Fuller makes styrene-butadiene-styrene (SBS)-based hot melts, and Shell makes hot melts (KRATON) based on SBS, styrene-isoprene-styrene, styrene-ethylene-butylene-styrene (SEBS), and styrene ethylene-propylene (SEP) block copolymers. In general, the basis of the hot melt materials is either rubber or EVA, with the structure being a block copolymer.

Physical Characteristics of the Bonded Polymer Structure

The bonded polymer structure, having first and second polymeric panels and adhesive layer or layers may range in thickness from about 100 μm to about 500 μm (about 4 mil to about 20 mil) depending on the application for which the structure will be used. The second polymeric panel may also be part of a multi-layered composition containing, for instance, multiple sheets of polyester or polystyrene or other material such as other polymers, paper, fabric, or metal, and may also range in total thickness from about 0.051 μm to about 254 μm (about 0.002 mil to about 10 mil) depending on the application for which the bonded polymer structure will be used.

The second polymeric panel may be a packaging material and may further contain a metallic layer, e.g., to form a better barrier to air or for decorative effect. The internal surface of the second polymeric panel, however, must be composed essentially of polyester, copolyester, polystyrene, polyethylene, polypropylene, acrylic, PVDC, PVC, or polypropylene copolymer or terpolymer to bond to the adhesive structure of the instant invention. In order to metallize the second polymeric panel, metal ions of various types and valences can be vapor deposited on the surface of the panel. Alternatively, a film of metal such as aluminum foil can be laminated to the second polymeric panel.

Method of Preparing the Bonded Polymer Structure

The present invention also provides a method of preparing the bonded polymeric structure comprising bonding a first polymeric panel to a second polymeric panel by (a) applying an adhesive or adhesive structure to the first polymeric panel, and (b) heat sealing the first polymeric panel and adhesive or adhesive structure to the second polymeric panel. The adhesive or adhesive structure may be applied to the first polymeric panel by methods which include coextrusion and coating.

1. Bonding of Panels to the Adhesive/Adhesive Structure Via Co-Extrusion

The first polymeric panel can be bonded to the adhesive or adhesive structure using conventional extrusion techniques. In particular, it may be co-extruded through a die plate fed by a plurality of extruders. These extruders carry the different molten materials for forming the panel. As is well known in the art, the die plate includes input ports, output ports, and channels connecting these input ports to output ports. The extruders feed the different molten materials to different input ports, and the channels are designed to configure the molten materials into the shapes of the panels desired. After extrusion, the first polymeric panel and the adhesive structure are heat-sealed to the second polymeric panel using heat seal bars.

2. Bonding of Panels to the Adhesive/Adhesive Structure Via Sequential Coating of Layers Alternatively, one or both of the tie layer and the sealant layer can be coated onto the first polymeric panel instead of being coextruded with the first polymeric panel. The first polymeric panel with tie and sealant layers is then heat sealed to the second polymeric panel. This alternative method of affixing the panel and adhesive to each other can be utilized if, for instance, a given pair of adjoining compositions do not coextrude well.

3. Bonding of Panels to the Adhesive/Adhesive Structure Via Hot Melt Compositions The use of hot melts as either the tie layer or sealant layer offers two methods of application: (1) immediately after the zipper (i.e. first panel) is extruded and cooled, or (2) just prior to application of the zipper to the packaging film (i.e. second panel). The preferred method od application is (2) just prior to application of the zipper to the film. This method will provide three main advantages. First and foremost, a stronger bond will be achieved between the zipper and the film because the hot melt is still warm and in the molten state when bonding to the film, versus being reheated to bond to the film as would be the case for method (1). The second advantage of method (2) is that the hot melt can be applied to either the zipper or the film, rather than to only the zipper. The final advantage of method (2) is that the zipper can be wound onto, and unwound from, a spool much more easily because it does not contain the tacky hot melt material.

Closure Arrangement

In one embodiment of the invention a closure arrangement is integrally formed with the first polymeric panel. The closure arrangement may be reclosable. The closure arrangement may be free of adhesive. In addition, the adhesive may be continuous along the first polymeric panel or "ribbed" with interrupted sections of uncoated panel interspersed with adhesive coated panel.

Turning now to the drawings, FIG. 1 illustrates a sectional view of a bonded polymer structure in the form of a reclosable bag comprising two first polymeric panels 18, 20, two second polymeric panels 14, 16, and an adhesive structure 19 comprising a tie layer and a sealant layer. The tie layer 10, 11 and the sealant layer 12, 13 are disposed between the first polymeric panels 18, 20 and the second polymeric panels 14, 16.

A closure arrangement 30 is integrally formed with the first polymeric panels 18, 20, and comprises a male closure profile 22, a female closure profile 24, and a guide post 26.

The male closure profile 22 extends inwardly from the inner surface of one of the panels of the closure arrangement and includes a single locking member with an expanded head. The female closure profile 24 extends inwardly from an upper flange portion of one of the first polymeric panels and includes a pair of flexible locking members 24 with hooks at the ends thereof. The pair of locking members 24 are disposed opposite the single locking member 22 and are spaced by a sufficient distance that the expanded head of the single locking member is releasably engageable between the pair of locking members 24. More specifically, the pair of locking members interlock with the single male locking member 22 in a snapping action caused by bringing the hooks of the pair of locking members past the expanded head of the locking member. To facilitate alignment of the pair of locking members 24 with the single locking member 22 during reclosure, the male closure profile 22 is provided with guide post 26 for guiding one of the pair of locking members 24 between the guide post 26 and the locking member 22.

To open the bag, the top and bottom second polymeric panels 14, 16 are separated from each other by cutting them apart. Next, the interlocked closure profiles 22, 24 are detached from each other by grabbing onto the top and bottom second polymeric panel 14, 16 and pulling them apart.

Figure 2:
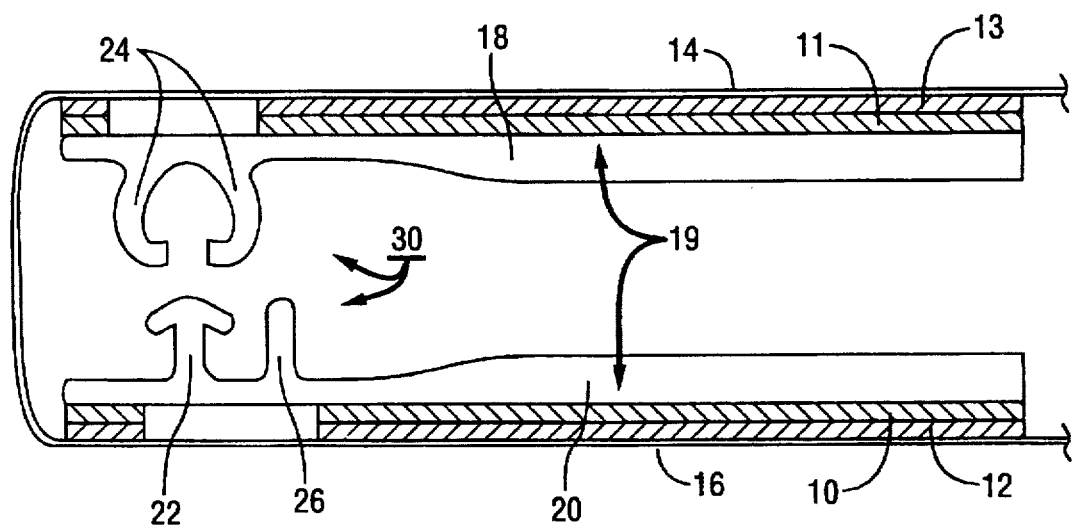
FIG. 2 is a sectional view of a bonded polymer structure wherein a two-layer adhesive structure is used to bind the polymeric panels and having a closure arrangement wherein the closure arrangement is free of the adhesive structure, and the two-layer adhesive is applied to both of the closure flanges.

FIG. 2 illustrates a sectional view of a bonded polymer structure in the form of a reclosable bag. The parts are analogous to those in FIG. 1 and are designated by the same reference numbers. The closure arrangement 30 is free of the adhesive structure 19, i.e., there is no adhesive structure on the outer surface of the panels of the closure arrangement in the area where the male 22 and female 24 closure profiles are located.

In preparing a bonded polymer structure having a closure arrangement as described by FIG. 1 and FIG. 2 by coextrusion, the output ports are arranged such that the panels including the closure arrangement 18, 20, the closure profiles 22, 24, the tie layers 10, 11 and the sealant layers 12, 13 exit the die plate with the connections shown in FIG. 1 and FIG. 2. Since the first polymeric panel 18 integrally formed with the female closure profile 24, tie layer 11, and sealant layer 13, is separated from the first polymeric panel 20 integrally formed with the male closure profile 22, guide post 26, tie layer 10, and sealant layer 12, it should be apparent that these two separate sets of elements may be formed in separate extrusions using two different die plates.

Figure 3:
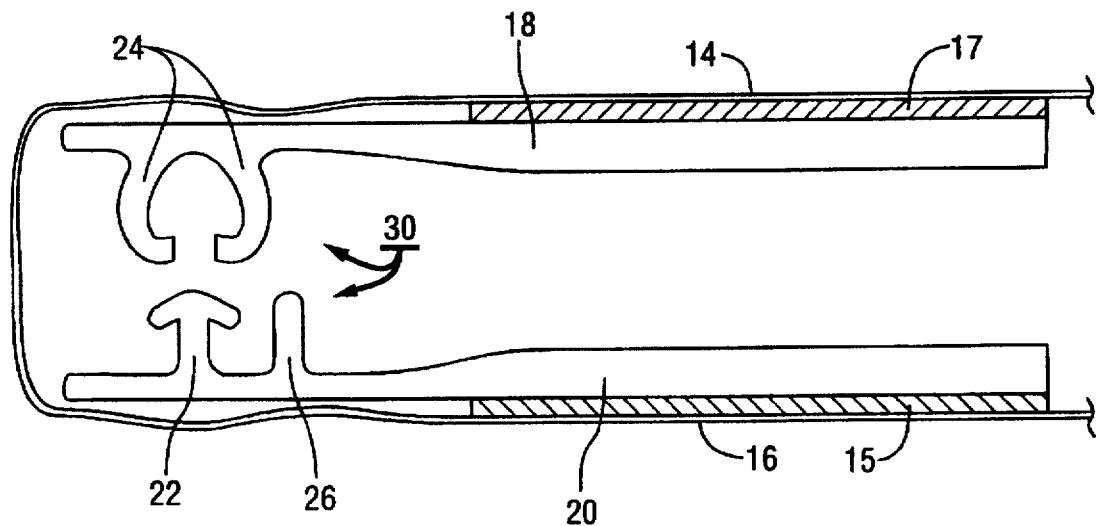
FIG. 3 is a sectional view of a bonded polymer structure wherein a one-layer adhesive is used to bind the polymeric panels and having a closure arrangement wherein the closure arrangement is free of the adhesive structure, and the one-layer adhesive is applied to only one of the closure flanges.
Figure 4:
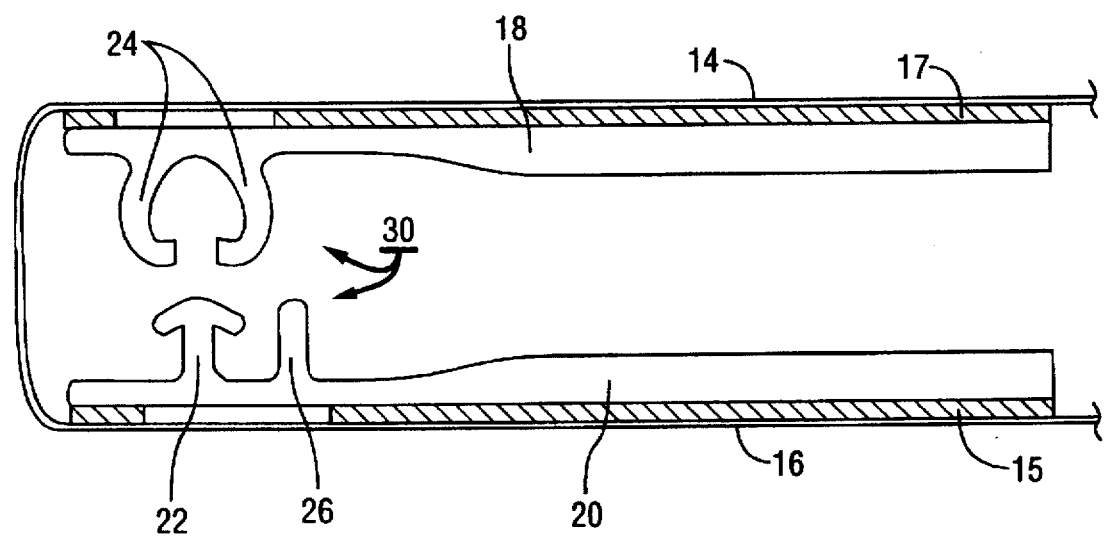
FIG. 4 is a sectional view of a bonded polymer structure wherein a one-layer adhesive is used to bind the polymeric panels and having a closure arrangement wherein the closure arrangement is free of the adhesive structure, and the one-layer adhesive is applied to both of the closure flanges.

FIG. 3 and FIG. 4 illustrate sectional views of a bonded polymer structure in the form of a reclosable bag where a one layer adhesive 15, 17 is used to seal the panels of the closure arrangement to the panels of the bag. The parts analogous to those in FIG. 1 and FIG. 2 are designated by the same reference numbers.

While the present invention has been described with reference to several particular embodiments, those skilled in the art will recognize that many changes may be made thereto without departing from the spirit and scope of the present invention.

What is claimed is:

1. A bonded polymer structure, comprising a first polymeric panel, a second polymeric panel having inner and outer sides, and an adhesive structure comprising a tie layer and a sealant layer, the tie layer and the sealant layer being disposed between the first polymeric panel and the second polymeric panel, the tie layer contacting the first polymeric panel and the sealant layer, and the sealant layer contacting the tie layer and the inner side of the second polymeric panel;

wherein the first polymeric panel consists essentially of polyethylene, polypropylene, copolymers of polyethylene and polypropylene, and physical mixtures thereof, the second polymeric panel consists essentially of polyester, the tie layer is selected from the group consisting of ethylene vinyl acetate (EVA), anhydride-modified polyolefin polymers, blends of EVA and anhydride-modified polyolefin polymers, anhydride-modified EVA polymers, acid-modified EVA polymers, acid-modified polyolefin polymers, amorphus polyolefin-modified EVA polymers, blends of any of the above materials with polyester or copolyester, and blends of polyolefins with polyester or copolyester, and the sealant layer is selected from the group consisting of polyester, copolyester, a polyester blend, and a copolyester blend.

2. The bonded polymer structure of claim 1, wherein the first polymeric panel consists essentially of polyethylene, and the tie layer consists of an anhydride-modified ethylene vinyl acetate polymer or an amorphus polyolefin-modified ethylene vinyl acetate polymer.

3. The bonded polymer structure of claim 1, wherein the first polymeric panel consists essentially of polypropylene, and the tie layer consists of an anhydride-modified ethylene vinyl acetate polymer or an amorphus polyolefin-modified ethylene vinyl acetate polymer.

4. The bonded polymer structure of claim 1, wherein the first polymeric panel consists essentially of a copolymer of polyethylene and polypropylene, and physical mixtures thereof, and the tie layer consists of an anhydride-modified ethylene vinyl acetate polymer or an amorphus polyolefin-modified ethylene vinyl acetate polymer.

5. The bonded polymer structure of claim 1, wherein a closure arrangement is integrally formed with the first polymeric panel.

6. The bonded polymer structure of claim 5, wherein said closure arrangement comprises two interlocking panels having inner and outer surfaces, wherein the inner surfaces of said interlocking panels are in contact when the closure arrangement is closed.

7. The bonded polymer structure of claim 5, wherein said closure arrangement is reclosable.

8. The bonded polymer structure of claim 5, wherein said closure arrangement is free of the adhesive structure.

9. The bonded polymer structure of claim 1, wherein the outer side of the second polymeric panel further contains a metallic layer.

10. A method of bonding a first polymeric panel to a second polymeric panel comprising the steps of:

(a) applying an adhesive structure to the first polymeric panel,
said adhesive structure comprising a tie layer and a sealant layer, said tie layer being selected from the group consisting of ethylene vinyl acetate (EVA), anhydride-modified polyolefin polymers, blends of EVA and anhydride-modified polyolefin polymers, anhydride-modified EVA polymers, acid-modified EVA polymers, acid-modified polyolefin polymers, amorphus polyolefin-modified EVA polymers, blends of any of the above materials with polyester or copolyester, and blends of polyolefins with polyester or copolyester,
said sealant layer being selected from the group consisting of polyester, copolyester, a polyester blend, and a copolyester blend, and
said first polymeric panel consisting essentially of polyethylene, polypropylene, copolymers of polyethylene and polypropylene, and physical mixtures thereof, and (b) heat sealing the first polymeric panel and adhesive structure of (a) to the second polymeric panel;
said second polymeric panel consisting essentially of polyester; and
said adhesive structure being disposed between the first polymeric panel and the second polymeric panel, the tie layer contacting the first polymeric panel and the sealant layer, and the sealant layer further contacting the inner side of the second polymeric panel.

11. The method of claim 10, wherein the adhesive structure is applied to the first polymeric panel by coextrusion.

12. The method of claim 10, wherein the adhesive structure is applied to the first polymeric panel by coating.

13. The method of claim 10, wherein a closure arrangement is integrally formed with said first polymeric panel.

14. The method of claim 13, wherein said closure arrangement comprises two interlocking panels having inner and outer surfaces, wherein the inner surfaces of said interlocking panels are in contact when the closure arrangement is closed.

15. The method of claim 13, wherein said closure arrangement is reclosable.

16. The method of claim 13, wherein said closure arrangement is free of the tie layer and the sealant layer.

17. The method of claim 10, wherein the outer side of the second polymeric panel further contains a metallic layer.

18. A bonded polymer structure, comprising a first polymeric panel, a second polymeric panel and an adhesive, the adhesive being disposed between and in direct contact with opposing surfaces of the first polymeric panel and the second polymeric panel, wherein the first polymeric panel is selected from the group consisting of polyethylene, polypropylene, copolymers of polyethylene and polypropylene, and physical mixtures thereof;

the second polymeric panel consists essentially of polyester; and the adhesive is a blend of two compounds and is selected from the group consisting of polyolefins blended with polyester, polyolefins blended with copolyester, ethylene vinyl acetate blended with polyester, and ethylene vinyl acetate blended with copolyester, wherein said adhesive contains at least about 80% by weight of the polyester/copolyester component and the remainder being of the other component.

19. The bonded polymer structure of claim 18, wherein a closure arrangement is integrally formed with the first polymeric panel.

20. The bonded polymer structure of claim 19, wherein said closure arrangement comprises two interlocking panels having inner and outer surfaces, wherein the inner surfaces of said interlocking panels are in contact when the closure arrangement is closed.

21. The bonded polymer structure of claim 19, wherein said closure arrangement is reclosable.

22. The bonded polymer structure of claim 19, wherein said closure arrangement is free of adhesive.

23. A bonded polymer structure, comprising a first polymeric panel, a second polymeric panel and an adhesive, the adhesive being disposed between and in direct contact with opposing surfaces of the first polymeric panel and the second polymeric panel, wherein the first polymeric panel is selected from the group consisting of polyethylene, polypropylene, copolymers of polyethylene and polypropylene, and physical mixtures thereof;

the second polymeric panel consists essentially of polyester;

the adhesive is selected from the group consisting of blends of polyolefins and polyester, polyolefins and copolyester, ethylene vinyl acetate and polyester, ethylene vinyl acetate and copolyester, acrylic, anhydride-modified polyolefin polymers, blends of EVA and anhydride-modified polyolefin polymers, anhydride-modified EVA polymers, acid-modified EVA polymers, acid-modified polyolefin polymers, amorphus polyolefin-modified EVA polymers, blends of any of the above materials with polyester or copolyester, and blends of polyolefins with polyester or copolyester; and the outer side of the second polymeric panel further contains a metallic layer.

24. A method of bonding a first polymeric panel to a second polymeric panel comprising the steps of:
(a) applying an adhesive to the first polymeric panel, said adhesive selected from the group consisting of polyolefins blended with polyester, polyolefins blended with copolyester, ethylene vinyl acetate blended with polyester, and ethylene vinyl acetate blended with copolyester, wherein said adhesive contains at least about 80% by weight of the polyester/copolyester component and the remainder being of the other component and said first polymeric panel selected from the group consisting of polyethylene, polypropylene, copolymers of polyethylene and polypropylene, and physical mixtures thereof; and (b) heat sealing the first polymeric panel and adhesive of (a) to the second polymeric panel;

said second polymeric panel consisting essentially of polyester; and said adhesive being disposed between and in direct contact with opposing surfaces of the first polymeric panel and the second polymeric panel.

25. The metho of claim 24, wherein the adhesive is applied to the first polymeric panel by coextrusion.

26. The method of claim 24, wherein the adhesive is applied to the first polymeric panel by coating.

27. The method of claim 24, wherein a closure arrangement is integrally formed with said first polymeric panel.

28. The method of claim 27, wherein said closure arrangement comprises two interlocking panels having inner and outer surfaces, wherein the inner surfaces of said interlocking panels are in contact when the closure arrangement is closed.

29. The method of claim 27, wherein said closure arrangement is reclosable.

30. The method of claim 27, wherein said closure arrangement is free of adhesive and the sealant layer.

31. A method of bonding a first polymeric panel to a second polymeric panel comprising the steps of:
(a) applying an adhesive to the first polymeric panel, said adhesive selected from the group consisting of blends of polyolefins and polyester, polyolefins and copolyester, ethylene vinyl acetate and polyester, ethylene vinyl acetate and copolyester, acrylic, anhydride-modified polyolefin polymers, blends of EVA and arthydride-modified polyolefin polymers, anhydride-modified EVA polymers, acid-modified EVA polymers, acid-modified polyolefin polymers, amorphus polyolefin-modified EVA polymers, blends of any of the above materials with polyester or copolyester, and blends of polyolefins with polyester or copolyester and said first polymeric panel selected from the group consisting of polyethylene, polypropylene, copolymers of polyethylene and polypropylene, and physical mixtures thereof; and (b) heat sealing the first polymeric panel and adhesive of (a) to the second polymeric panel;

said second polymeric panel consisting essentially of polyester; and said adhesive being disposed between and in direct contact with opposing surfaces of the first polymeric panel and the second polymeric panel and wherein the outer side of the second polymeric panel further contains a metallic layer.

* * * * *